United States Patent
Yeh

(10) Patent No.: US 7,201,625 B2
(45) Date of Patent: Apr. 10, 2007

(54) FOAM PRODUCT HAVING OUTER SKIN AND METHOD FOR PRODUCING THE SAME

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 0 days.

(21) Appl. No.: 11/271,920

(22) Filed: Nov. 14, 2005

(65) Prior Publication Data

US 2006/0105650 A1 May 18, 2006

Related U.S. Application Data

(63) Continuation-in-part of application No. 11/103,861, filed on Apr. 12, 2005, and a continuation-in-part of application No. 11/018,430, filed on Dec. 20, 2004, and a continuation-in-part of application No. 10/797,094, filed on Mar. 11, 2004, now Pat. No. 6,988,920.

(30) Foreign Application Priority Data

Sep. 22, 2005 (TW) .............................. 94132879 A

(51) Int. Cl.
*B63B 1/00* (2006.01)
(52) U.S. Cl. .......................................... 441/65; 441/74
(58) Field of Classification Search ................. 441/65, 441/74; 264/45.4, 257, 258; 428/124
See application file for complete search history.

(56) References Cited

U.S. PATENT DOCUMENTS

| | | | | |
|---|---|---|---|---|
| 4,693,856 A | | 9/1987 | Rubens et al. | |
| 4,850,913 A | | 7/1989 | Szabad, Jr. | |
| 4,961,715 A | | 10/1990 | Shanelec | |
| 5,211,593 A | | 5/1993 | Schneider et al. | |
| 5,217,660 A | * | 6/1993 | Howard | 264/45.4 |
| 5,658,179 A | | 8/1997 | Glydon et al. | |
| 5,718,968 A | * | 2/1998 | Cutler et al. | 264/45.4 |
| 6,210,613 B1 | * | 4/2001 | Stein et al. | 264/45.4 |
| 6,241,926 B1 | * | 6/2001 | Cutler | 264/45.4 |
| 6,492,000 B1 | * | 12/2002 | Matsuki et al. | 428/124 |
| 6,620,357 B2 | * | 9/2003 | Bruning et al. | 264/45.4 |
| 6,908,351 B2 | * | 6/2005 | Burke | 441/65 |
| 6,955,576 B2 | | 10/2005 | Yeh | |
| 2004/0176001 A1 | | 9/2004 | Yeh | |

* cited by examiner

*Primary Examiner*—Lars A. Olson
(74) *Attorney, Agent, or Firm*—Rosenberg, Klein & Lee

(57) ABSTRACT

A method for producing a foam product having an outer skin is provided. The outer skin is firstly placed in a mold and then a plurality of polystyrene foam beads are introduced into the mold in order to fill a cavity of the mold with the foam beads, which are heat-bonded with one another under steam pressure subsequently. Accordingly, a surface of the outer skin, which contacts with the foam beads, is entirely heat-bonded with the foam beads. Thus, the foam product with the outer skin is produced and the foam product comprises the outer skin and a polystyrene foam core composed of the foam beads, which are heat-bonded with one another without any spaces.

21 Claims, 8 Drawing Sheets

FOAM PRODUCT HAVING OUTER SKIN AND METHOD FOR PRODUCING THE SAME

CROSS REFERENCE TO RELATED APPLICATION

This is a continuation-in-part application of the U.S. Ser. No. 10/797,094 application, filed on Mar. 11, 2004, now U.S. Pat. No. 6,988,920 and also is a continuation-in-part application of the U.S. Ser. No. 11/018,430 application, filed on Dec. 20, 2004, and is a continuation-in-part application of the U.S. Ser. No. 11/103,861 application, filed on Apr. 12, 2005.

TECHNICAL FIELD

This invention relates generally to methods for producing a foam product, in particular, to a method for molding a foam product, which has a plastic outer skin thereon.

BACKGROUND OF THE INVENTION

A conventional foam product, such as a sport board, generally comprises a foam core and outer film/foam sheets heat-laminated over all surfaces of the foam core, as disclosed in U.S. Pat. Nos. 5,658,179 and 4,850,913. The foam core of the foam product is composed of foam material and shaped into a predetermined figure. The outer film/foam sheets are provided for heat-laminating with the surfaces of the foam core separately.

Additionally, U.S. Pat. No. 5,211,593 discloses a foam-core structure with a graphics-imprinted skin and U.S. Pat. No. 6,955,576 discloses a polyethylene foam board with patterned outer skin that are also similar to the above mentioned foam product.

In U.S. Publication No. 2004/0176001 A1, a slider that comprises a foam core, a top layer and a bottom layer is disclosed. The foam core is preferably made of polystyrene foam material, namely polystyrene foam board, and the foam core is also preshaped and heat-laminated with the top layer and the bottom layer.

Furthermore, U.S. Pat. No. 4,693,856 discloses a method for molding of expanded plastic articles from a plurality of synthetic resinous particles. The method briefly comprises providing foam particles, introducing into the foam particles an expanding agent, disposing the particles within a mold, and introducing a heated steam to cause the particles to expand and adhere to one another. In addition, U.S. Pat. No. 4,961,715 further discloses improved water sport equipment, which comprises a water sport board composed of expanded polypropylene foam beads. The foam beads are fused together in a mold under steam pressure to form the water sport board.

SUMMARY OF INVENTION

It is therefore an object of the present invention to provide a method for producing a foam product that has an outer skin.

Another object of the present invention is to provide foam products having outer skins that can be applied to sport, recreation and luggage equipment, and the like.

The method of the present invention generally comprises following steps. Firstly, provide a mold and place a plastic outer skin in a cavity of a mold. Then, introduce a plurality of polystyrene foam beads into the cavity of the mold so as to fill the cavity with the polystyrene foam beads. Finally, inject steam into the cavity, whereby under the steam, the polystyrene foam beads are heat-bonded with one another, and a surface of the plastic outer skin, which contacts with the polystyrene foam beads, is accordingly heat-bonded with the polystyrene foam beads entirely.

Additionally, under steam pressure, the temperature of the steam is arranged to allow the polystyrene foam beads heat-bonding with one another, and also heat-bonding with the surface of the plastic outer skin. Accordingly, the foam product having the outer skin is produced.

Therefore, the foam product comprises the plastic outer skin and a polystyrene core composed of the polystyrene foam beads, which are heat-bonded with one another without any spaces and heat-bonded with the surface of the plastic outer skin without spaces.

Because the core and the skin of the foam product are integrally and securely formed at one time, the present invention has advantages of easy to produce, saving time and labor cost in its productions.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
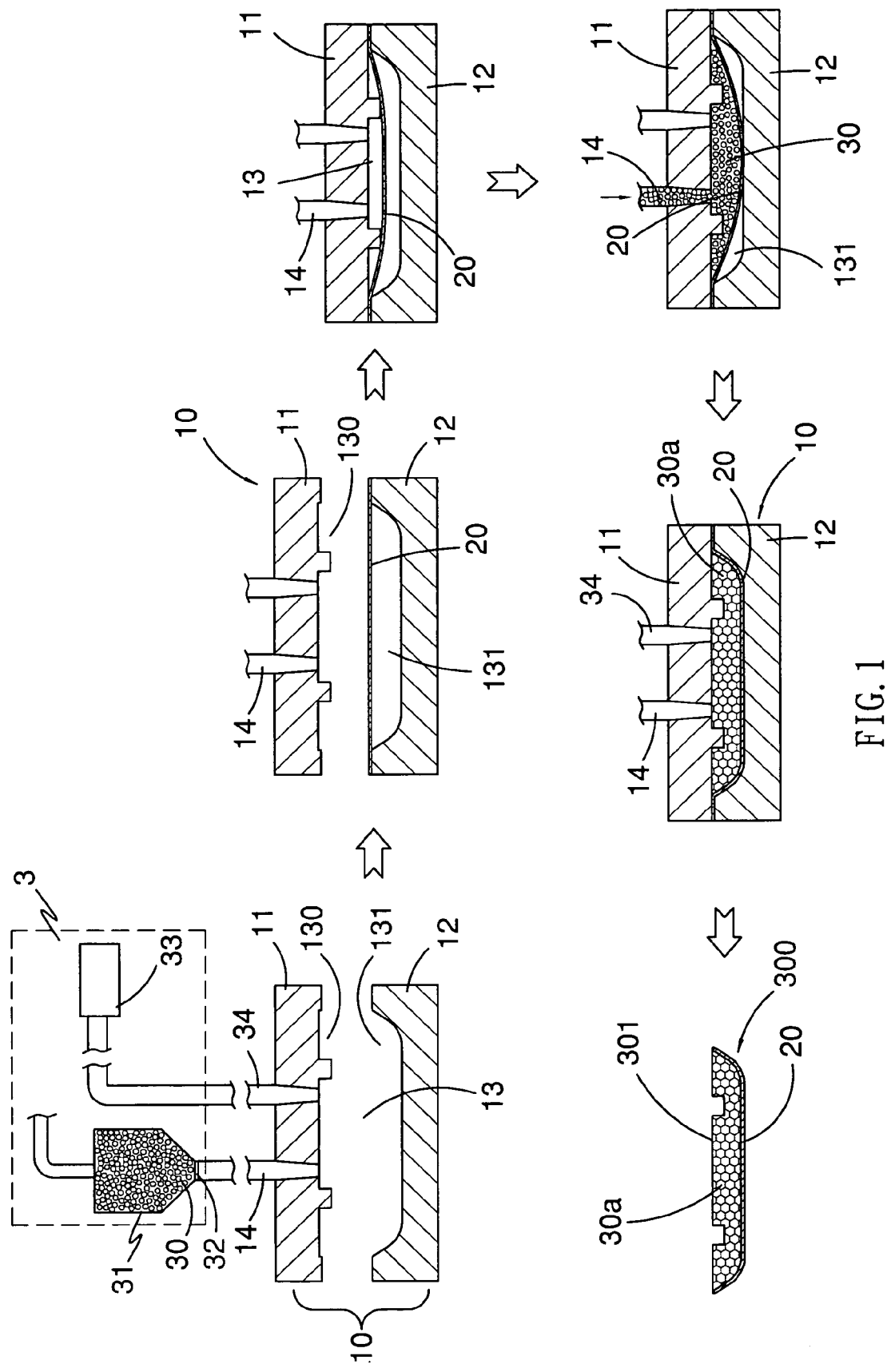
FIG. 1 is a flow chart of a first embodiment of the present invention, showing one method for producing a foam product.

FIG. 1 shows a first preferred embodiment of the present invention and a method for producing a first foam product 300 having an outer skin 20. In the present invention, the first foam product 300 can be regarded as a finished foam product, also a semi-finished foam product, depending on its various applications. As shown in FIG. 1, the method for producing the first foam product 300 comprises the following steps.

Firstly, providing a mold 10, which has a cavity 13 therein, and the cavity 13 has dimensions identical to the first foam product 300. Preferably, the mold 10 is composed of an upper mold half 11 and a lower mold half 12. The upper mold half 11 and the lower mold half 12 have sub-cavities 130, 131 respectively that forms the cavity 13 after the upper mold half 11 and the lower mold half 12 are engaged. Additionally, the upper mold half 11 connects with an injection device 3. The injection device 3 includes a hopper 31 and a steam supplier 33 both respectively connected to the upper mold half 11 via pips 14, 34. The hopper 31 is loaded with polystyrene foam beads 30 or other similar kinds of foam beads, which are pre-expanded and has spherical shapes. Furthermore, a gate 32 is installed in the hopper 31 for controlling the discharge of the polystyrene foam beads 30. The steam supplier 33 is provided for supplying steam with particular pressure and temperature to the mold 10.

Then, placing a first plastic outer skin 20 in the cavity 13 of the mold 10. In the present invention, the first plastic outer skin 20 is preferably placed above the lower mold half 12 to cover the sub-cavity 131, and edges of the first plastic outer skin 20 are secured after the upper mold half 11 and the lower mold half 12 are engaged.

Finally, actuating the injection device 3 to introduce the polystyrene foam beads 30 into the cavity 13 of the mold 10 so as to fill the cavity 13 with the sufficient polystyrene foam beads 30, and subsequently to inject steam into the cavity 13, whereby under the steam, the polystyrene foam beads 30 are expanded appropriately and heat-bonded with one another, and a surface of the plastic outer skin 20, which contacts with the polystyrene foam beads 30, is accordingly heat-bonded with the polystyrene foam beads 30 entirely.

In the present invention, the temperature of the steam is precisely arranged to allow all surfaces of the polystyrene foam beads 30 to heat-bond (or to fuse) with one another. Additionally, the steam also allows the first plastic outer skin 20 to become softened and causes fusion of the surface of the first plastic outer skin 20 precisely. Under the steam and the pressure, the polystyrene foam beads 30 are expanded and compressed one another, and the first plastic outer skin 20 is accordingly expanded by the compressed polystyrene foam beads 30 into a shape identical to the cavity 13. When the temperature has dropped, the surfaces of the polystyrene foam beads 30 are fully heat-bonded (or fused) with one another, also with the surface of the first plastic outer skin 20, without any spaces, namely interstitial spaces. Therefore, the first foam product 300 is produced after removing from the mold 10 and a trimming process. In the present invention, the first plastic outer skin is preferably a thermoplastic material or other similar plastic materials.

According to the above method, the first foam product 300 comprises the first plastic outer skin 20 and a first core 30*a* composed of the polystyrene foam beads 30. The first plastic outer skin 20 is heat-bonded with a top and edges of the first core 30*a* except a bottom of the first core 30*a*, which faces to the sub-cavity 130 of the upper mold half 11 and reveals a first polystyrene surface 301 of the first core 30*a*. Therefore, when the first foam product 300 is applied to sport equipment, e.g. a slider or a snowboard, it could be regarded as a semi-finished product for a slider because it would need a second product to integrate with via the first polystyrene surface 301 of the first core 30*a*, so as to produce a complete finished product. On the contrary, when the first foam product 300 is directly applied to other sport, recreation or luggage equipment, e.g. a bicycle saddle or a luggage cushion, it could be regarded as a finished product despite the revealed first polystyrene surface 301 of the first core 30*a*.

Figure 2:
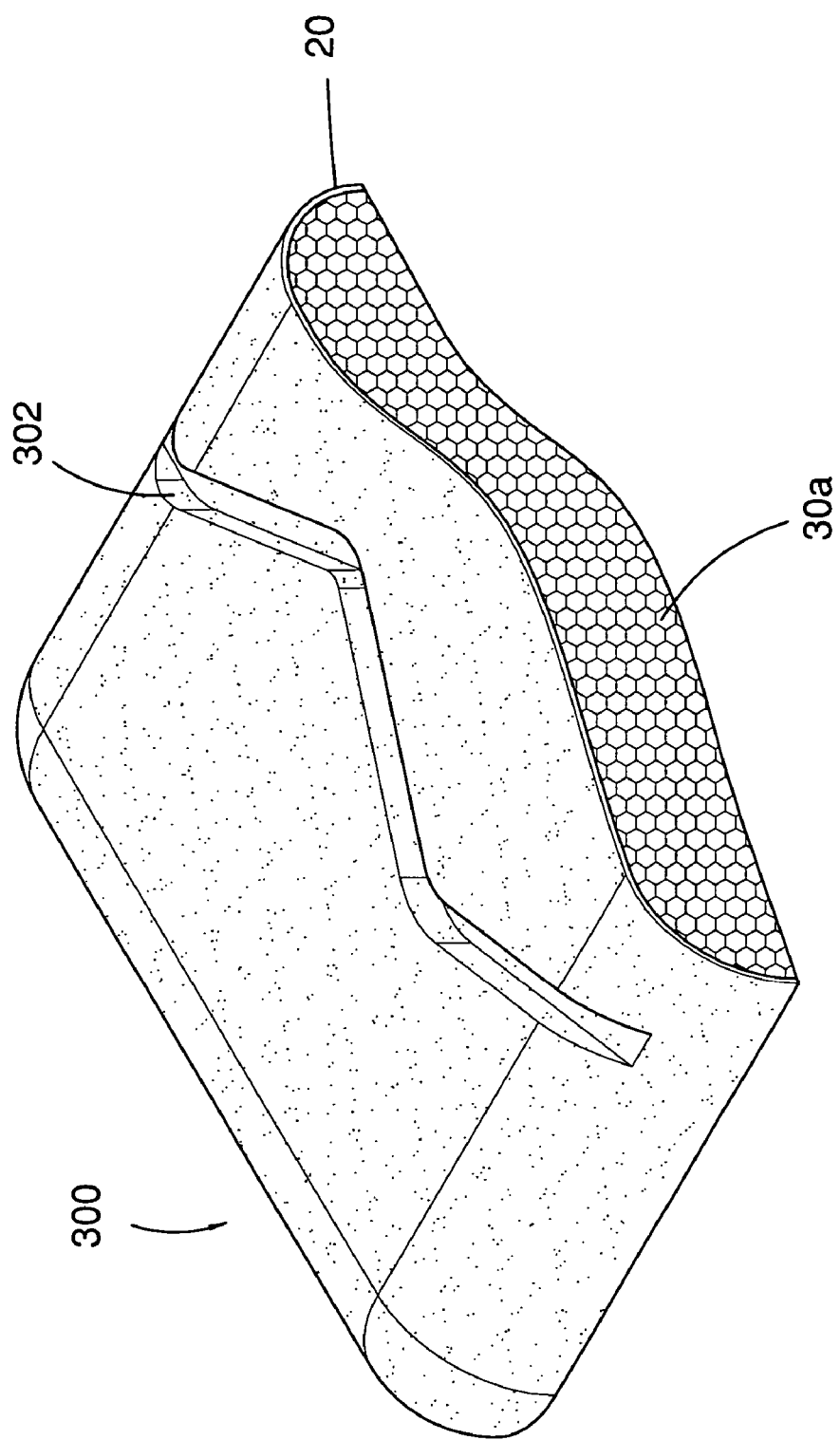
FIG. 2 is a perspective view of the first embodiment of the present invention, showing the foam product.

In FIG. 2, the top and edges surfaces of the first foam product 300 further have recesses 302 formed thereon. The recesses 302 of the first foam product 300 are formed corresponding to the design of the cavity 13 of the mold 10. Accordingly, the foam product of the present invention is capable of forming any protrusions and any recesses on the surface of the foam product, so as to form a significant three-dimensional design on the foam product.

Figure 3:
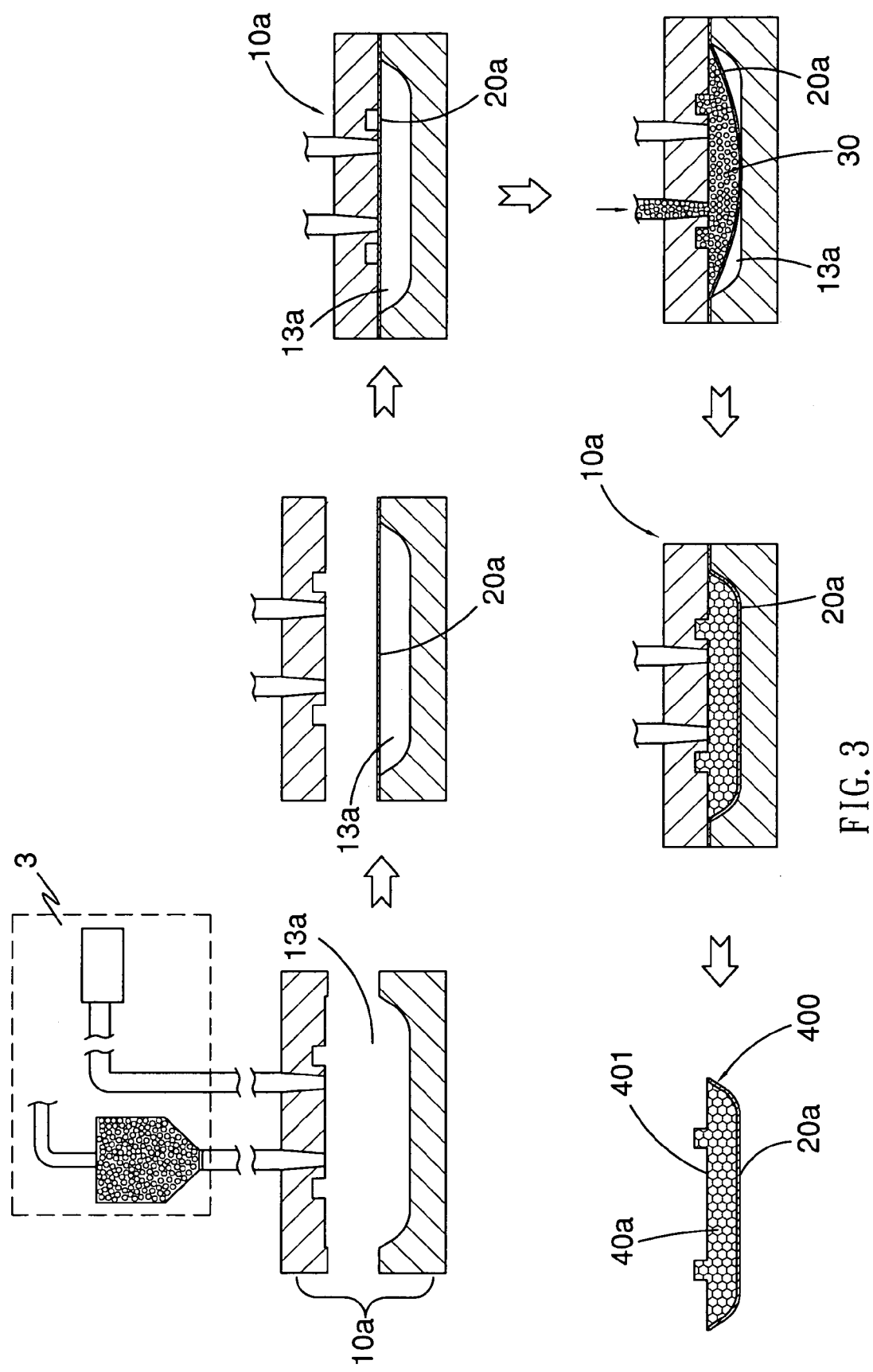
FIG. 3 is a flow chart of a second embodiment of present invention, showing another method for producing a foam product.

FIG. 3 shows a second preferred embodiment of the present invention and a method for producing a second foam product 400 having an outer skin 20*a*. Similarly to the first preferred embodiment, the second foam product 400 also can be regarded as a finished product or a semi-finished product according to its applications, and the method for producing the second foam product 400 is similar to the first foam product 300 and comprises the following steps: firstly, providing a mold 10*a*, which has a cavity 13*a* therein, and the cavity 13*a* has dimensions identical to the second foam product 400. Subsequently, placing a second plastic outer skin 20*a* in cavity 13*a* of the mold 10*a*, and then introducing polystyrene foam beads 30 and injecting steam into the cavity 13*a* via the injection device 3. Accordingly, the cavity 13*a* is filled with the polystyrene foam beads 30 which are heat-bonded with one another, and a surface of the second plastic outer skin 20*a* is heat-bonded with the polystyrene foam beads 30 entirely.

Figure 4:
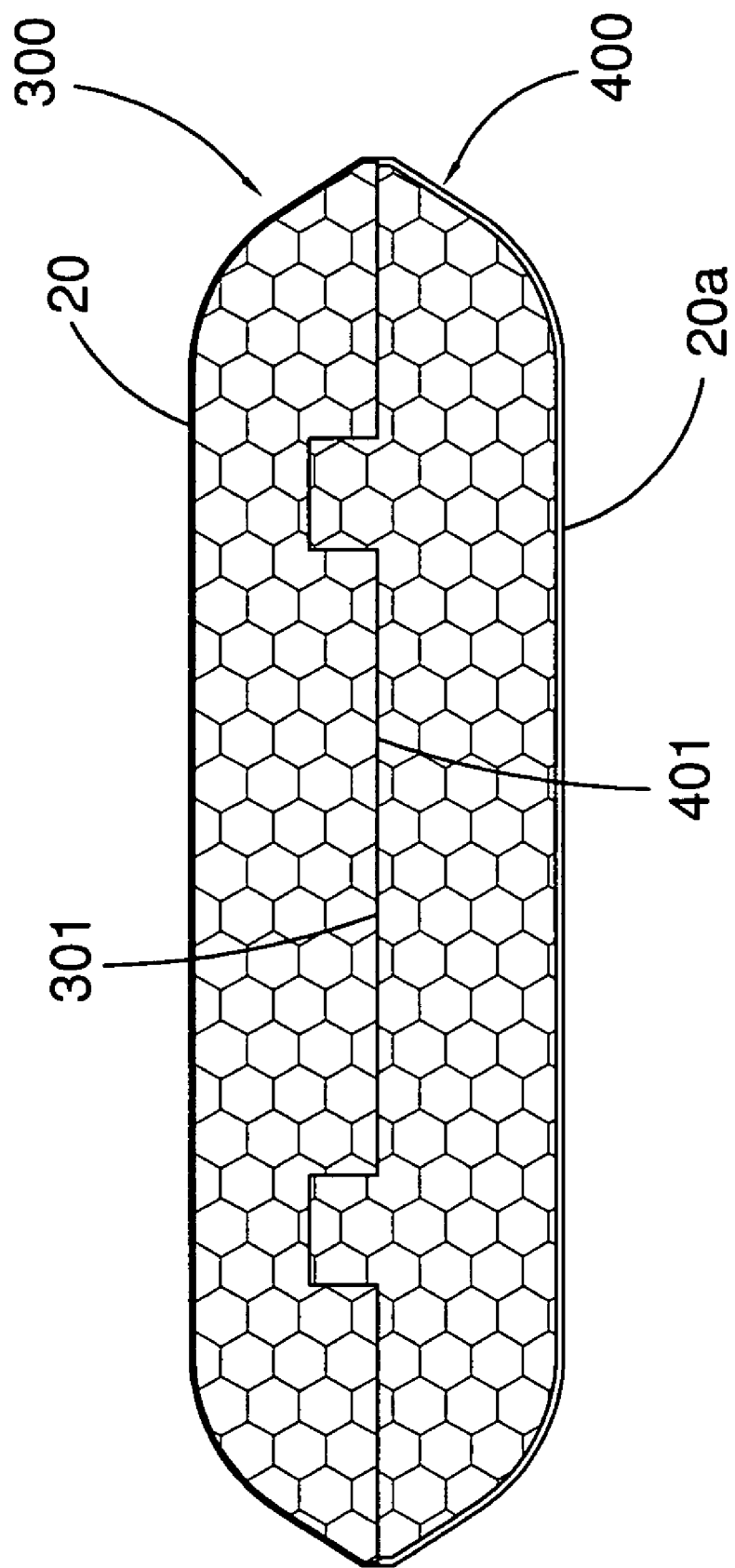
FIG. 4 is a cross sectional view of the foam product of the present invention, showing the foam product comprising a first foam product and a second foam product.

Similarly to the first foam product 300, the second foam product 400 comprises the second plastic outer skin 20*a* and a second core 40*a* composed of the polystyrene foam beads 30. The second plastic outer skin 20*a* is heat-bonded with a top and edges of the second core 40*a* except a bottom of the second core 40*a*, which reveals a second polystyrene surface 401 of the second core 40*a*. Therefore, when the second foam product 400 is regarded as a semi-finished product for the slider in connection with the semi-finished product of the first foam product 300, the second polystyrene surface 401 of the second core 40*a* is provided for connecting to the first polystyrene surface 301 of the first core 30*a* accordingly, so as to integrate the first foam product 300 and the second foam product 400 into a complete foam product. In the present invention, the first foam product 300 and the second foam product 400 can be bonded with each other by gluing the first polystyrene surface 301 with the second polystyrene surface 401, or by forming recessions on the first polystyrene surface 301 and forming protrusions, which are provided for wedging into the recessions respectively, on the second polystyrene surface 401 as shown in FIG. 4, or by other conventional methods for integrating the first foam product 300 and the second foam product 400 into the foam product. Optionally, the first polystyrene surface 301 and the second polystyrene surface 401 can be either flat or curve, or can be different or same shapes or sizes as long as they can be integrated with each other when they are served as semi-finished products.

Figure 5:
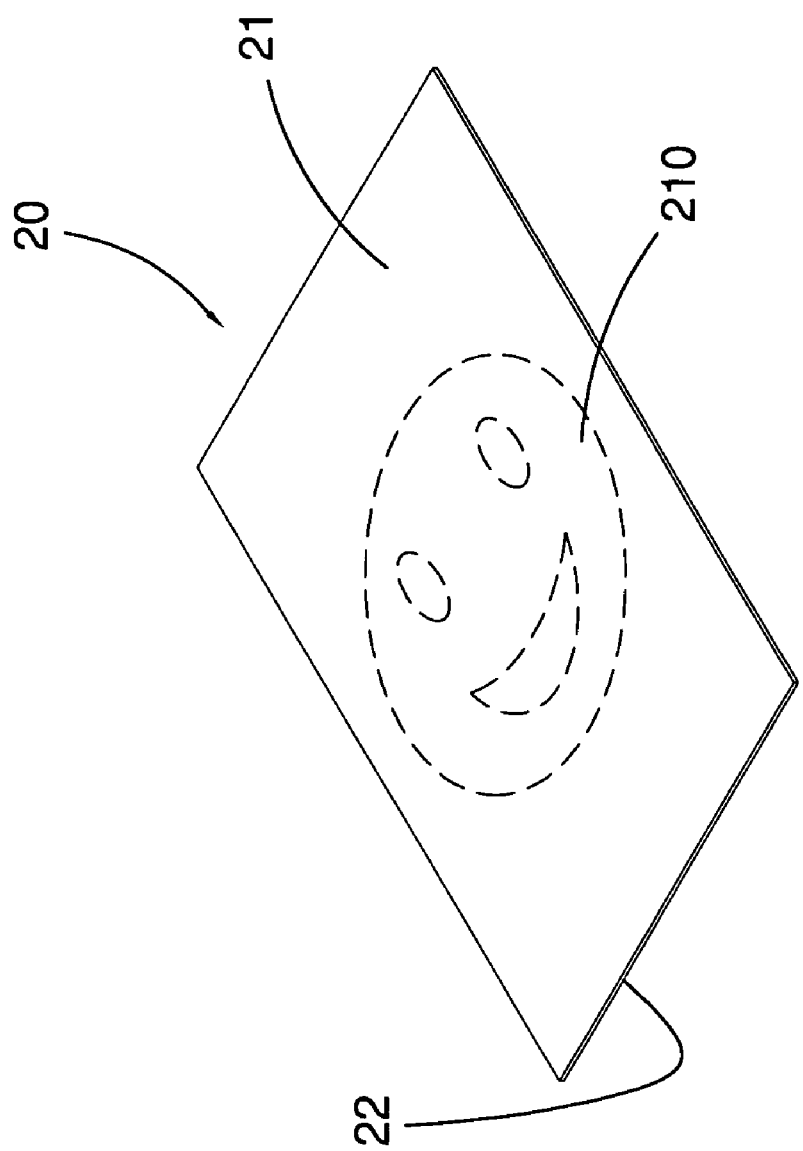
FIG. 5 is a perspective view of a plastic outer skin of the present invention.

Furthermore, regarding to the plastic outer skin of the present invention, namely the first and second plastic outer skins 20, 20*a*, structures of the plastic outer skin of the foregoing foam product can be various. More specifically, taking the first plastic outer skin 20 as an example, a method for producing the first plastic outer skin 20 comprises the steps of: providing a plastic film 21, which has visible patterns 210 therein, namely the patterns 210 being visible from outside of the plastic film 21. Preferably, the plastic film is a polyethylene film. Then, forming a bonding film 22 on a surface of the plastic film 21 via extrusion coating processes, whereby the surface of the plastic film 21 is capable of heat-bonding with the polystyrene foam beads 30 perfectly as shown in FIG. 5. Because it is known that the polystyrene material is incompatible with the polyethylene material, the bonding film 22 is provided for enhancing the bonding between the plastic film 21 and the polystyrene foam beads 30. In the present invention, the bonding film 22 is a copolymer, which mainly allows the plastic film 21 to heat-bond with the polystyrene foam beads 30, and the bonding film 2 has a thickness in range of 0.01 to 0.1 mm, preferably in range of 0.03 to 0.05 mm.

Figure 6:
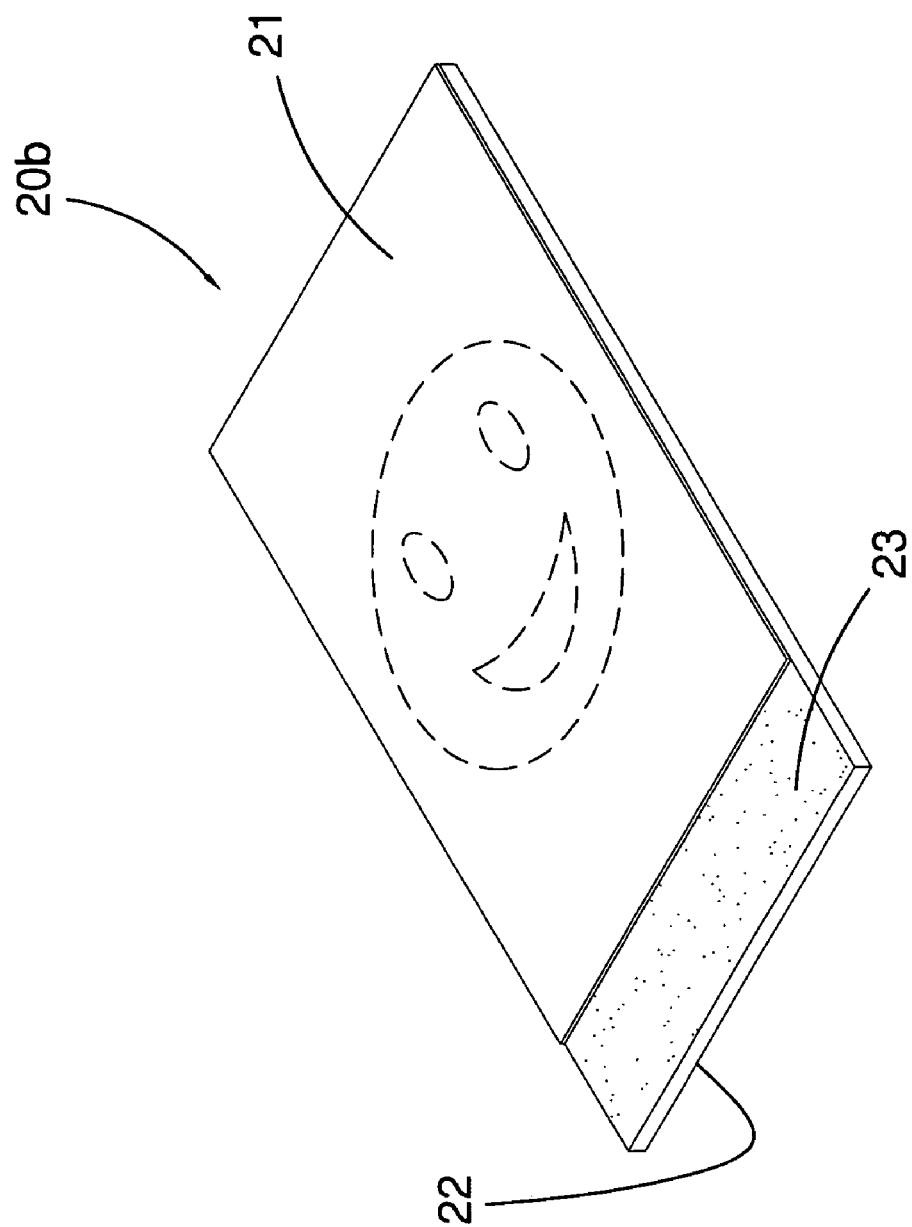
FIG. 6 is a perspective view of another plastic outer skin of the present invention.

FIG. 6 further shows another plastic outer skin 20b of the present invention, and a method for producing the plastic outer skin 20b comprises the steps of: providing a polyethylene foam skin 23, which has a density in a range of 1.5 to 12 PCF and a thickness in a range of 1 to 6 mm, and then, causing the foregoing plastic film 21 to heat-bond with a first surface of the polyethylene foam skin 23. Last, forming the foregoing bonding film 22 on a second surface of the polyethylene foam skin 23 via extrusion coating processes, whereby the second surface of the polyethylene foam skin 23 is capable of heat-bonding with the polystyrene foam beads 30 perfectly.

Figure 7:
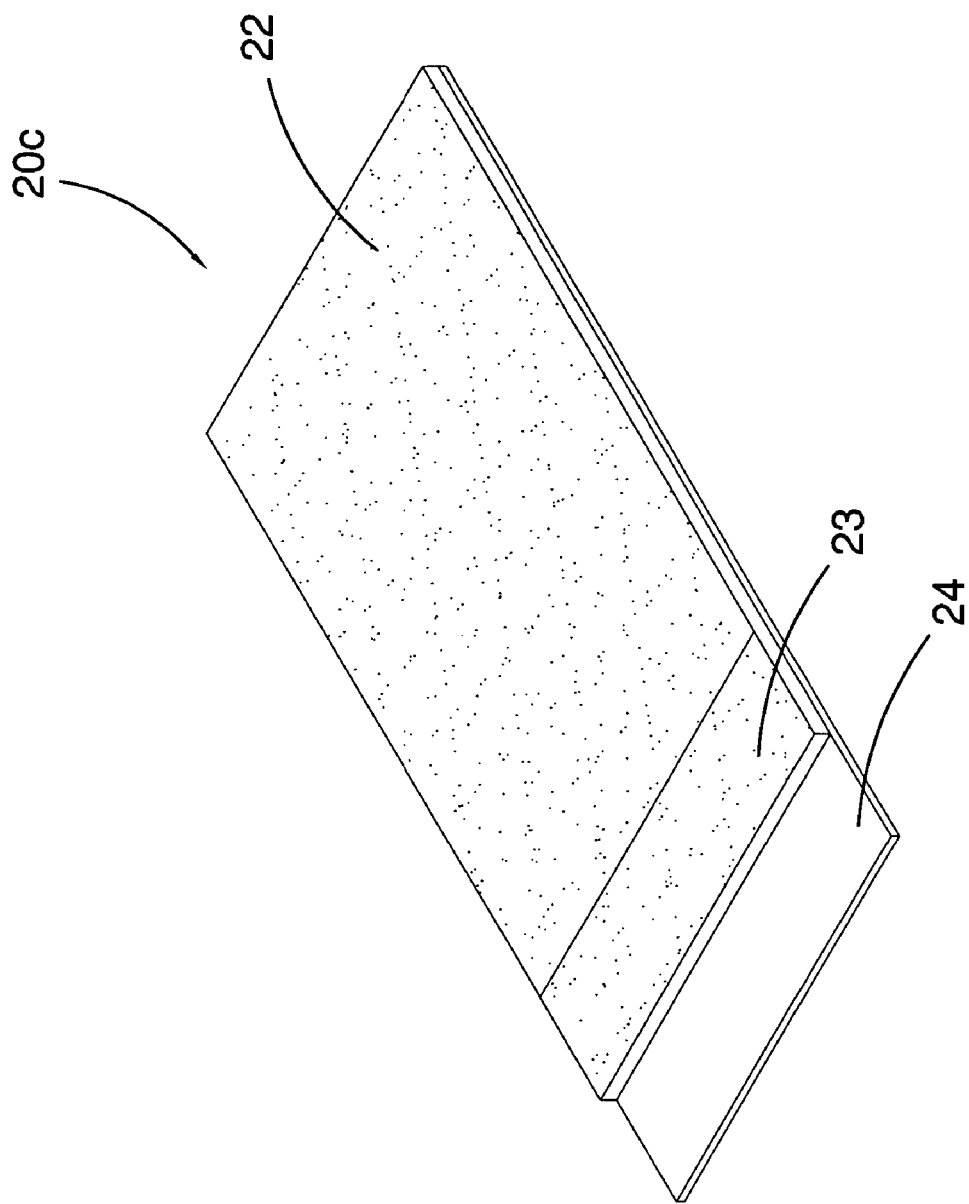
FIG. 7 is a perspective view of a further plastic outer skin of the present invention.

FIG. 7 further shows a further plastic outer skin 20c of the present invention, and a method for producing the plastic outer skin 20c comprises the steps of: providing the foregoing polyethylene foam skin 23, and forming a plastic plate 24 on a first surface of the polyethylene foam skin 23. Preferably, the plastic plate 24 is made of wear-resistant plastic. Last, forming the foregoing bonding film 22 on a second surface of the polyethylene foam skin 23 via extrusion coating processes.

Figure 8:
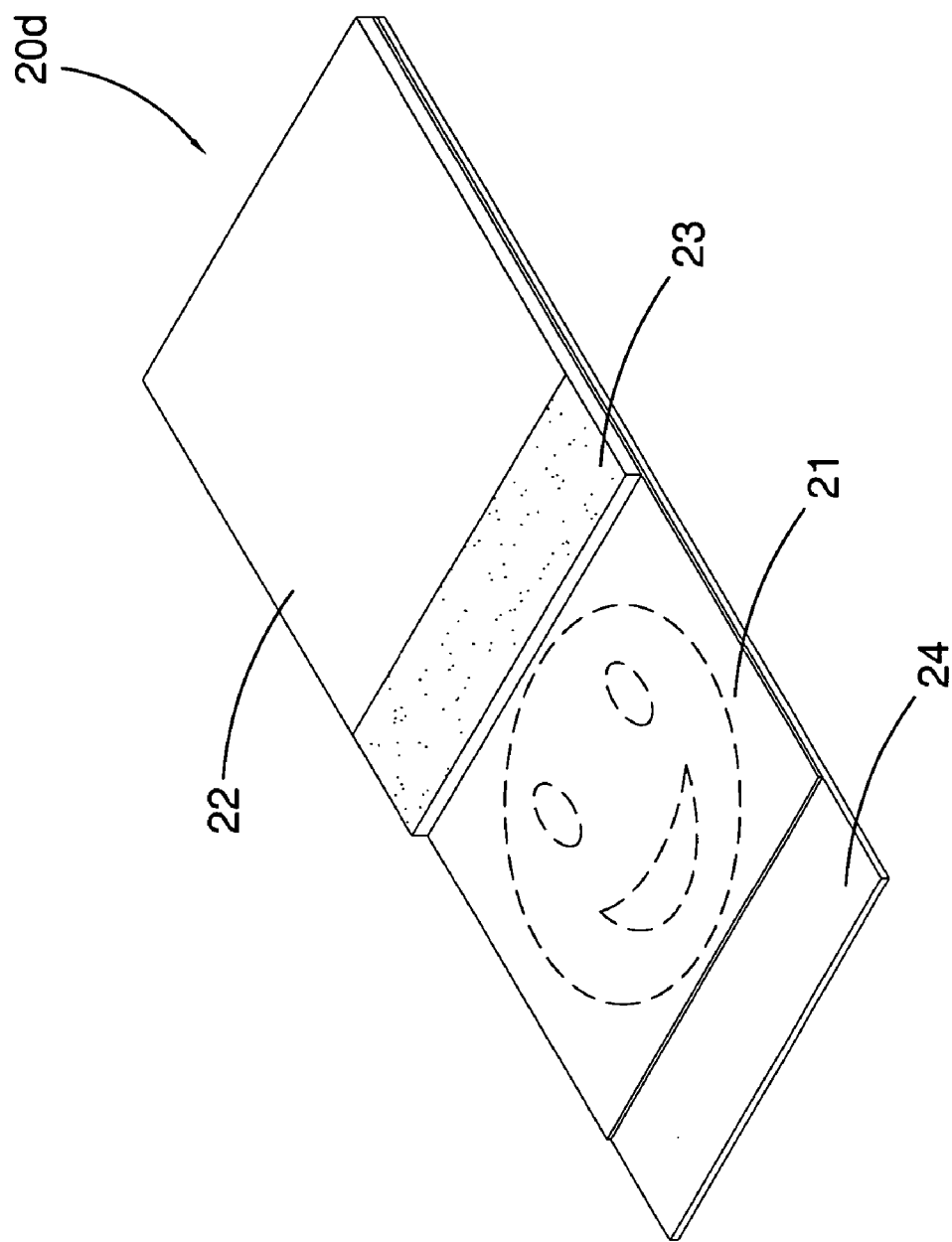
FIG. 8 is a perspective view of a further plastic outer skin of the present invention.

Moreover, FIG. 8 show a further plastic outer skin 20d of the present invention, and a method for producing the plastic outer skin 20d comprises the steps of: providing the foregoing polyethylene foam skin 23, and causing a first surface of the foregoing plastic film 21 on a first surface of the polyethylene foam skin 23. Then, forming the foregoing plastic plate 24 on a second surface of the plastic film 21. Preferably, the plastic plate 24 is made of wear-resistant plastic and has a thickness greater than the plastic film 21. Finally, forming the foregoing bonding film 22 on a second surface of the polyethylene foam skin 23.

Additionally, as the above mentioned, the bonding film 22 allows the plastic film 21 to heat-bond with the polystyrene foam beads 30. Therefore, the bonding film 22 is unnecessary when the foam beads 30 are made of polyethylene materials. Furthermore, the foregoing patterned plastic film 21 could be formed by any conventional processes. Preferably, the patterned plastic film 21 is produced by the following steps: firstly, providing a first film and then printing the patterns on a surface of the first film, and subsequently forming a second film on the surface of the first film via extrusion coating processes, so as to cover and protect the patterns. Once the patterned plastic film 21 is applied to the foam product and covered by other films or plates, it would be better to provide a transparent or semi-transparent films or plates to cover the patterned plastic film 21 so as to show the patterns.

According to the above descriptions, the foam product of the present invention has advantages of light in weight, easy to shape, and durable foam/skin structure. Therefore, the present invention is applicable to various equipment, such as sliders, sport boards, shoe soles, cushions, luggage and guards etc.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

I claim:

1. A method for producing a foam product comprising the steps of:
    providing a mold defining a cavity having dimensions identical to those of the foam product;
    placing a plastic skin in the cavity, wherein the plastic skin is produced by the following steps:
        providing a polyethylene foam skin, which has a density in a range of 1.5 to 12 PCF and a thickness in a range of 1 to 6 mm;
        forming a plastic plate on a first surface of the polyethylene foam skin,
    wherein the plastic plate is made of wear-resistant plastic; and
        forming a bonding film on a second surface of the polyethylene foam skin, so as to allow the second surface of the polyethylene foam skin heat-bonding with polystyrene foam beads;
    filling the cavity of the mold with polystyrene foam beads; and
    injecting steam into the cavity, whereby the polystyrene foam beads are heat-bonded with one another and the plastic skin is accordingly heat-bonded with the polystyrene foam beads entirely under the steam.

2. A method for producing a foam product comprising the steps of:
    providing a mold defining a cavity having dimensions identical to those of the foam product;
    placing a plastic skin in the cavity, wherein the plastic skin is produced by the following steps:
        providing a polyethylene foam skin, which has a density in a range of 1.5 to 12 PCF and a thickness in a range of 1 to 6 mm;
        providing a plastic film, which has visible patterns therein;
        causing a first surface of the plastic film to heat-bond with a first surface of the polyethylene foam skin;
        forming a plastic plate on a second surface of the plastic film, wherein the plastic plate is made of wear-resistant plastic and has a thickness greater than the plastic film; and
        forming a bonding film on a second surface of the polyethylene foam skin, so as to allow the second surface of the polyethylene foam skin heat-bonding with the polystyrene foam beads;
    filling the cavity of the mold with polystyrene foam beads; and
    injecting steam into the cavity, whereby the polystyrene foam beads are heat-bonded with one another and the plastic skin is accordingly heat-bonded with the polystyrene foam beads entirely under the steam.

3. The method of the claim 2, wherein the plastic film is produced by the following steps:
    providing a first film;
    printing the patterns on a surface of the first film; and
    forming a second film on the surface of the first film via extrusion coating processes, so as to cover the patterns.

4. A method for producing a foam product comprising the steps of:
    providing a mold defining a cavity having dimensions identical to those of the foam product;
    placing a plastic skin in the cavity, wherein the plastic skin is produced by the following steps:
        providing a plastic film, which has visible patterns therein, wherein the plastic film is produced by the following steps:
            providing a first film;

printing the patterns on a surface of the first film; and
forming a second film on the surface of the first film via extrusion coating processes, so as to cover the patterns; and forming a bonding film on the plastic film to allow the heat-bonding of the plastic film with polystyrene foam beads;

filling the cavity of the mold with polystyrene foam beads; and injecting steam into the cavity, whereby the polystyrene foam beads are heat-bonded with one another and the plastic skin is accordingly heat-bonded with the polystyrene foam beads entirely under the steam.

5. A method for producing a foam product comprising the steps of:

providing a mold defining a cavity having dimensions identical to those of the foam product;

placing a plastic skin in the cavity, wherein the plastic skin is produced by the following steps:

providing a polyethylene foam skin, which has a density in a range of 1.5 to 12 PCF and a thickness in a range of 1 to 6 mm;

providing a plastic film, which has visible patterns therein, wherein the plastic film is produced by the following steps:

providing a first film;

printing the patterns on a surface of the first film; and forming a second film on the surface of the first film via extrusion coating processes, so as to cover the patterns;

causing the plastic film to heat-bond with a first surface of the polyethylene foam skin; and forming a bonding film on a second surface of the polyethylene foam skin, so as to allow the second surface of the polyethylene foam skin heat-bonding with the polystyrene foam beads;

filling the cavity of the mold with polystyrene foam beads; and injecting steam into the cavity, whereby the polystyrene foam beads are heat-bonded with one another and the plastic skin is accordingly heat-bonded with the polystyrene foam beads entirely under the steam.

6. A foam product comprising:

a first foam product comprising a first core and a first plastic outer skin formed on a top and edges of the first core, wherein the first core is composed of foam beads, which are heat-bonded with one another; and a second foam product comprising a second core and a second plastic outer skin formed on a top and edges of the second core, wherein the second core is composed of foam beads, which are heat-bonded with one another, and a bottom of the second core is connected to a bottom of the first core accordingly, so as to integrate the first foam product and the second foam product into the foam product.

7. The foam product of claim 6, wherein the first plastic outer skin comprises a plastic film having visible patterns therein.

8. The foam product of claim 7, wherein the second plastic outer skin comprises a plastic film having visible patterns therein.

9. The foam product of claim 7, wherein the second plastic outer skin comprises:

a polyethylene foam skin, having a density in a range of 1.5 to 12 PCF and a thickness in a range of 1 to 6 mm; and a plastic plate, heat-bonded with the polyethylene foam skin, wherein the plastic plate is made of wear-resistant plastic.

10. The foam product of claim 7, wherein the second plastic outer skin comprises:

a polyethylene foam skin, having a density in a range of 1.5 to 12 PCF and a thickness in a range of 1 to 6 mm;

a plastic film, heat-bonded with the polyethylene foam skin, wherein the plastic film has visible patterns therein; and a plastic plate, heat-bonded with the plastic film, wherein the plastic plate is made of wear-resistant plastic and has a thickness greater than the plastic film.

11. The foam product of claim 6, wherein the first plastic outer skin comprises:

a polyethylene foam skin, having a density in a range of 1.5 to 12 PCF and a thickness in a range of 1 to 6 mm; and a plastic film, heat-bonded with the polyethylene foam skin, wherein the plastic film has visible patterns therein.

12. The foam product of claim 11, wherein the second plastic outer skin comprises:

a polyethylene foam skin, having a density in a range of 1.5 to 12 PCF and a thickness in a range of 1 to 6 mm; and a plastic plate, heat-bonded with the polyethylene foam skin, wherein the plastic plate is made of wear-resistant plastic.

13. The foam product of claim 11, wherein the second plastic outer skin comprises:

a polyethylene foam skin, having a density in a range of 1.5 to 12 PCF and a thickness in a range of 1 to 6 mm;

a plastic film, heat-bonded with the polyethylene foam skin, wherein the plastic film has visible patterns therein; and a plastic plate, heat-bonded with the plastic film, wherein the plastic plate is made of wear-resistant plastic and has a thickness greater than the plastic film.

14. The foam product of claim 6, wherein the foam beads of the first core and the second core are polystyrene foam beads.

15. The foam product of claim 14, wherein the first plastic outer skin comprises:

a plastic film, having visible patterns therein; and a bonding film, formed on a surface of the plastic film, so as to allow the surface of the plastic film heat-bonding with the polystyrene foam beads.

16. The foam product of claim 15, wherein the second plastic outer skin comprises:

a plastic film, having visible patterns therein; and a bonding film, formed on a surface of the plastic film, so as to allow the surface of the plastic film heat-bonding with the polystyrene foam beads.

17. The foam product of claim 15, wherein the second plastic outer skin comprises:

a polyethylene foam skin, having a density in a range of 1.5 to 12 PCF and a thickness in a range of 1 to 6 mm;

a plastic plate, heat-bonded with a first surface of the polyethylene foam skin, wherein the plastic plate is made of wear-resistant plastic; and a bonding film, formed on a second surface of the polyethylene foam skin, so as to allow the second surface of the polyethylene foam skin heat-bonding with the polystyrene foam beads.

18. The foam product of claim 15, wherein the second plastic outer skin comprises:
- a polyethylene foam skin, having a density in a range of 1.5 to 12 PCF and a thickness in a range of 1 to 6 mm;
- a plastic film, heat-bonded with a first surface of the polyethylene foam skin, wherein the plastic film has visible patterns therein; and
- a plastic plate, heat-bonded with the plastic film, wherein the plastic plate is made of wear-resistant plastic and has a thickness greater than the plastic film.; and
- a bonding film, formed on a second surface of the polyethylene foam skin, so as to allow the second surface of the polyethylene foam skin heat-bonding with the polystyrene foam beads.

19. The foam product of claim 14, wherein the first plastic outer skin comprises:
- a polyethylene foam skin, having a density in a range of 1.5 to 12 PCF and a thickness in a range of 1 to 6 mm;
- a plastic film, heat-bonded with a first surface of the polyethylene foam skin, wherein the plastic film has visible patterns therein; and
- a bonding film, formed on a second surface of the polyethylene foam skin, so as to allow the second surface of the polyethylene foam skin heat-bonding with the polystyrene foam beads.

20. The foam product of claim 19, wherein the second plastic outer skin comprises:
- a polyethylene foam skin, having a density in a range of 1.5 to 12 PCF and a thickness in a range of 1 to 6 mm;
- a plastic plate, heat-bonded with a first surface of the polyethylene foam skin, wherein the plastic plate is made of wear-resistant plastic; and
- a bonding film, formed on a second surface of the polyethylene foam skin, so as to allow the second surface of the polyethylene foam skin heat-bonding with the polystyrene foam beads.

21. The foam product of claim 19, wherein the second plastic outer skin comprises:
- a polyethylene foam skin, having a density in a range of 1.5 to 12 PCF and a thickness in a range of 1 to 6 mm;
- a plastic film, heat-bonded with a first surface of the polyethylene foam skin, wherein the plastic film has visible patterns therein; and
- a plastic plate, heat-bonded with the plastic film, wherein the plastic plate is made of wear-resistant plastic and has a thickness greater than the plastic film; and
- a bonding film, formed on a second surface of the polyethylene foam skin, so as to allow the second surface of the polyethylene foam skin heat-bonding with the polystyrene foam beads.

* * * * *